May 28, 1935. A. L. MARVEL ET AL 2,002,823
MOTOR VEHICLE CHASSIS FRAME
Filed April 3, 1934
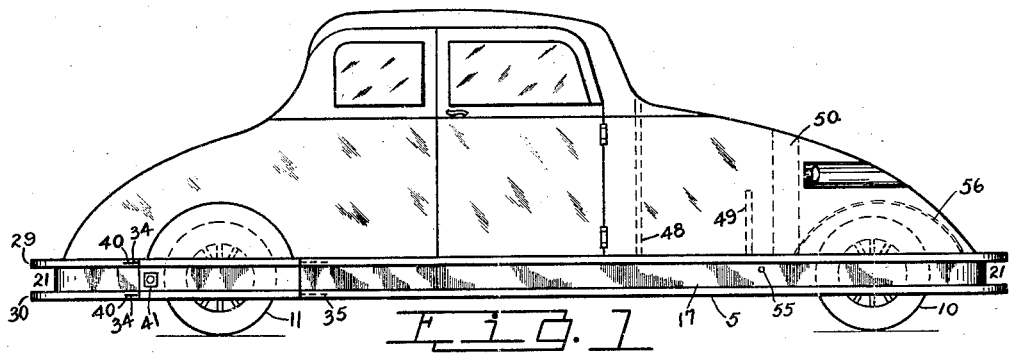
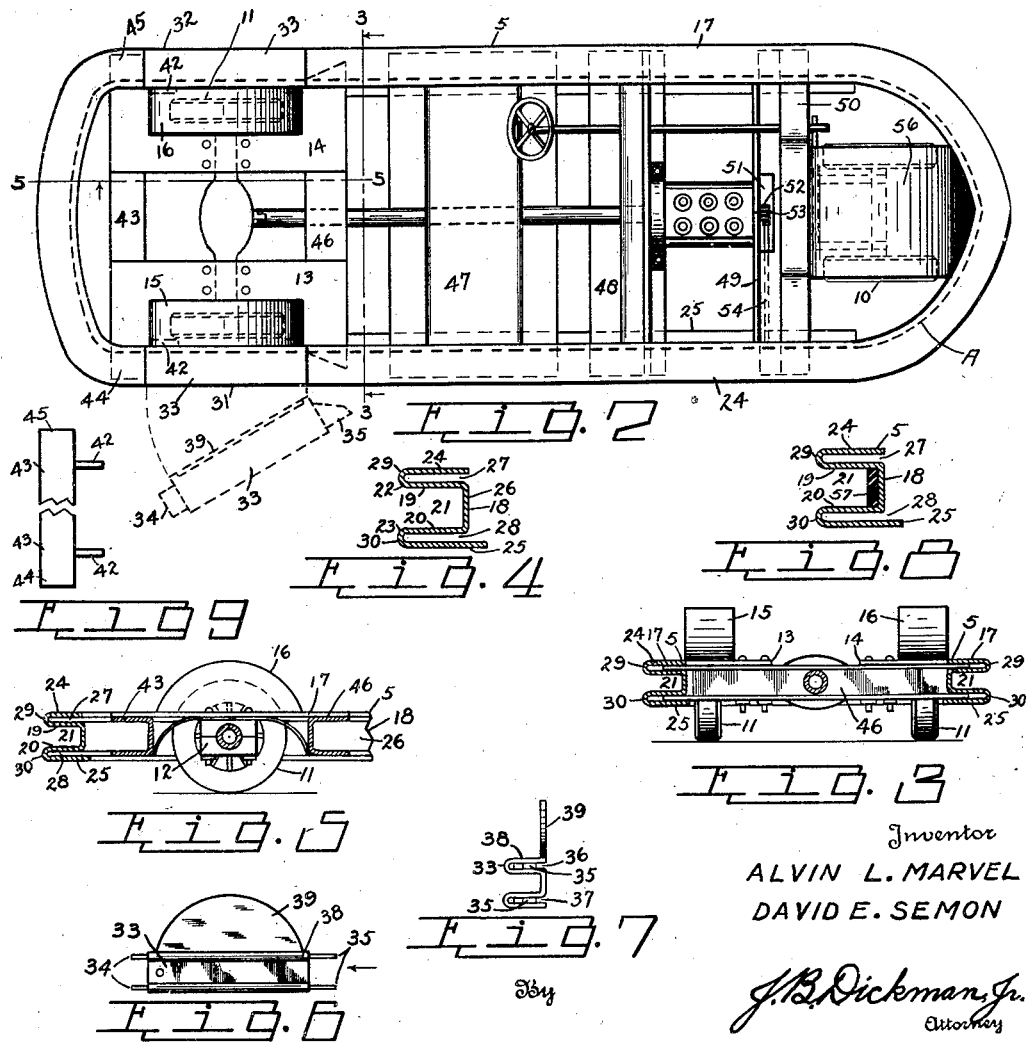
Inventor
ALVIN L. MARVEL
DAVID E. SEMON Patented May 28, 1935

2,002,823

UNITED STATES PATENT OFFICE 2,002,823

MOTOR VEHICLE CHASSIS FRAME

Alvin L. Marvel, Seaford, Del., and David E. Semon, St. Pauls, N. C.

Application April 3, 1934, Serial No. 718,820

9 Claims. (Cl. 280—106)

The present invention relates to motor vehicle chassis frames, in which the outer portion of the frame serves as a protective bumper against injury to the operating parts of the machine and to the body.

The universal use of motor vehicles has increased the danger of accidents, and it is an object of our invention to provide a means whereby injury to motor vehicles such as the operating mechanism, fenders and the like, and to occupants of such vehicles is reduced to a minimum.

Accidents are caused by motor vehicles colliding head on, or by one vehicle sideswiping another machine in line of travel and attempting to pass the other machine, and when such accidents occur it usually results in damage to the various parts of the mechanism of the vehicles in collision, such as the wheels, radiator, etc., as well as to the body and fenders.

It is therefore a salient object of our invention to provide a motor vehicle chassis frame, so constructed that in the event of a collision, vehicles equipped with our invention, one of the colliding machines will sheer off to one side or the other, with the result that no damage will be done to the bodies or fenders of the colliding vehicles, nor to the operating mechanism.

A further object of our invention is the provision of a chassis frame having a main rail of substantially U-shaped configuration and reversed U-shaped portions, all being formed from a single piece of metal.

A still further object of our invention is the provision of a rail having an enlarged U-shaped portion with a channel way, the flanges or legs forming the channel way extending in one direction to a predetermined point and then reversed in the opposite direction forming reduced U-shaped portions at the top and bottom of the rail with channel ways therein, the lower flange or leg of the reduced bottom channel extending an appreciable distance past the inner wall of the bight of the enlarged U-shaped portion.

A still further object of our invention is the provision of a chassis frame provided with a rail, the top face of the rail serving as a step or running board.

A still further object of our invention is the provision of a motor vehicle chassis frame provided with a rail portion in which all of the wheels are within the confines of the rail, provision being made in the rail adjacent each rear wheel with a detachable rail section, the front wheels being inset from the sides of the rail.

A still further object of our invention is the provision of a rubber cushion affixed to one face of the bight of the large channel way.

A still further object of our invention is the provision of a rail having the upper and lower flanges or legs reversed upon themselves forming protruding arms, the double thickness providing a durable structure vertically, the arms being reinforced by the tongues of the transverse members interposed between the inner portions of the rail, providing a chassis frame that is indestructible.

A still further object of our invention is the provision of rubber cushion blocks encasing the axles of the wheels as a shock absorbing means.

With the foregoing and other objects in view, the invention consists in the novel arrangement and combination of parts hereinafter more specifically claimed and illustrated in the accompanying drawing in which:—

Figure 1 is a side elevational view of a motor vehicle illustrating my rail bumper frame.

Figure 2 is a top plan view of the chassis frame, illustrating the continuous rail, the reinforcing transverse members and the arrangement of the plurality of wheels, a detachable section of the rail adjacent one wheel being illustrated in dotted lines.

Figure 3 is a section taken on line 3—3 of Figure 2 illustrating the arrangement of the tongues of the transverse members in the reduced channel ways, some of the transverse members having right angularly disposed arms acting as abutments shown in dotted lines in Figure 2 of the drawing.

Figure 4 is an enlarged detail sectional view of the chassis frame rail.

Figure 5 is a sectional view taken on line 5—5 of Figure 2 looking in the direction of the arrows illustrating the rubber cushion block through which the rear axle passes.

Figure 6 is a side elevational view of the detachable section of the rail adjacent the rear wheels showing the engageable tongues and the shroud.

Figure 7 is an end elevational view of the detachable section of the rail Figure 6, looking in the direction of the arrow.

Figure 8 is another enlarged detail sectional view of the chassis frame rail illustrating the provision of a rubber cushion in the large channel way.

Figure 9 is a top plan view of one of the transverse U-shaped members illustrating the right angle flange abutments, and the tongues engageable in the reduced channel ways of the rail.

In the drawing the body forms no part of our invention but it is shown for the purpose of illustrating the position of the body on our improved chassis frame as illustrated by the dotted line A on Figure 2 of the drawing, illustrating how the body is offset from the outer edge of the rail.

In the drawing forming a part of the specification, our improved chassis frame 5 is supported by the usual front and rear axles which in turn are supported upon the front wheels 10 and the rear wheels 11. The axles of the front and rear wheels may be provided with the usual leaf springs, however if desired a rubber cushion block 12 illustrated in Figure 5 of the drawing, may be bolted or otherwise secured to the plates 13 and 14, the rubber cushion as applied to the front wheels not shown. The plates 13 and 14 are provided with arcuate splash members 15 and 16 over the rear wheels, and these splash members may be of integral structure, or may be affixed to the plates in any suitable manner.

The rail 17 of the chassis frame is formed from a single piece of metal which may be stamped or molded, and it comprises a bight portion 18, a top flange or leg 19 and a bottom flange or leg 20. These flanges or legs extend in one direction a predetermined distance forming a large channel way 21. At 22 and 23 the flanges or legs 24 and 25 are reversed and extend in an opposite direction, the end of the top flange or leg 24 being uniplanar with the inner wall 26 of the bight portion 18, the lower flange or leg 25 extending a short distance beyond the inner wall of the bight portion. The inner faces of the flanges or legs 24 and 25 are in spaced relation to the top faces of the flanges or legs 19 and 20 forming channel ways 27 and 28 for a purpose to be later described. By forming the rail 17 as described a pair of rigid parallel arms 29 and 30 are formed, and these arms extend outwardly in a horizontal plane a sufficient distance to prevent damage to the body of the vehicles in collision and to the running gear.

The rail 17 completely encircles the running gear of the motor vehicle and is so positioned as to be in alinement with the axes of the wheels 10 and 11. Adjacent each of the rear wheels is provided openings 31 and 32 into which openings a detachable member 33 is engageable. The detachable member 33 being part of the rail structure has approximately the same structural features as the rail and it is provided with a pair of tongues 34 and 35 on each end. The tongues 34 and 35 may be formed of strap metal rigidly positioned in the channel ways 36 and 37 and secured in the channel ways in any suitable manner. The top flange 38 of the detachable member 33 is provided with an arcuate portion 39 which may be integral with the detachable member and which serves as a shroud in the arcuate portions 15 and 16 of the plate members 13 and 14. As fully disclosed by the drawing, the frame 5 is provided with gaps adjacent each rear wheel of the chassis in order that access may be had to the rear wheels when the occasion arises, and these gaps are normally bridged by the detachable members 33 as above specifically specified.

The tongues 35 of the detachable members engage the channel ways 27 and 28 on one side of the openings, the tongues 35 having one edge disposed at an angle. The tongues 34 of the detachable member 33 engage slots 40 in the lateral arms 29 and 30. The detachable members 33 are securely held in position by a bolt and nut 41 that engages the right angular flange 42 shown in dotted lines on the transverse member 43 illustrated in Figure 2 of the drawing. The member 43 is of U-shape configuration and this member is interposed between the rail and is provided with a pair of tongues 44 and 45 on each end. These tongues as illustrated in dotted lines on Figure 2 of the drawing engage the channel ways 27 and 28 and are secured therein in any suitable manner. A transverse U-shaped member 46 is interposed between the rail on the opposite side of the opening 31 the outer wall of the bight portion of the member 46 being uniplanar with the transverse wall opening of the rail 17, and this member 46 is provided with right angular flanges as the member 43, the flanges acting as abutments to prevent the detachable member 33 from becoming disengaged. The tongues of the transverse member 46 are formed to meet the configuration of the tongues 35 of the detachable members 33, thus providing a tight joint in the channel ways.

Interposed between the rail 17 are the transverse members 47, 48, 49 and 50, each of which are equipped with tongues as illustrated by dotted lines in Figure 2 of the drawing. The transverse member 47 serves as a seat base, the transverse member 48 as a combined dash board and engine mounting. The transverse member 49 serves as an engine mounting and is provided with an opening 51 for free movement of the engine crank shaft 52 which is provided with a cog wheel 53. A transverse crank handle 54 provided with a worm gear on one end engages the cog wheel 53 when it becomes necessary to crank the engine manually, the other end of the crank handle arm being provided with the usual square head 55, the bight portion of the rail 17 acting as a bearing for the crank handle. The transverse strap 50 is provided with tongues which engage the channel way 27, the arcuate portion of the strap serving as a brace for the cowl of the engine. Interposed between the nose of the rail and the transverse member 49 is an arcuate plate member 56, having one end secured in any suitable manner to transverse member 49, the other end of the plate member 56 provided with a tongue that engages the channel way 27 of the rail 17. This plate acts as a splash guard for the front wheels preventing the mud, water and dirt from entering the interior of the body. It is to be noted that the front wheels are positioned in close proximity to each other and are out of traction or alignment with the rear wheels. By this arrangement we provide separate traction for each wheel thus providing a more equalizing balancing effect if the car runs off the road, and in case of a blowout the car is not apt to turn over as the car will drive on either front wheel.

In Figure 8 of the drawing we have illustrated a shock absorbing means which consists of a resilient rubber cushion 57 of suitable thickness affixed to the bight portion 18 of the rail 17 for preventing the parallel arms 29 and 30 from contacting the metal wall of the bight portion, thus reducing the shock from the impact of a collision.

In the structural features as outlined in the specification cars so equipped with our device will be easier to control, capsizing of cars will be practically eliminated and damage to the bodies and running mechanism of vehicles in collision reduced to a minimum.

While the principles of the invention will always be adhered to, the invention is susceptible to certain changes and modifications and we do not wish to limit ourselves to the exact structure and changes may be made without departing from the spirit or scope of our invention, but what we claim is:

1. A motor vehicle chassis frame comprising a front rail section, a rear rail section, the ends of the front and rear rail sections joined together by members forming continuations of the rail sections and readily removable therefrom, the rail sections and members being of substantial U-shape in cross section with the side walls of the U-return bent upon themselves, and means at the ends of the removable members for securing said members to the rails.

2. A motor vehicle chassis frame comprising rail sections at opposite sides of the vehicle and fixedly secured together by cross bars, members forming continuations of said rail sections and readily removable therefrom, the rail sections and members being of substantial U-shape in cross section with the side walls of the U-return bent upon themselves and means at the ends of the removable members for securing said members to the rails.

3. A motor vehicle chassis frame comprising rail sections at opposite sides of the vehicle and fixedly secured together by cross bars, members forming continuations of said rail sections and equipped with arcuate portions, said members being readily removable from said rail sections, the rail sections and members being of substantial U-shape in cross section with the side walls of the U-return bent upon themselves and means at the ends of the removable members for securing said members to the rails.

4. A motor vehicle chassis frame comprising rail sections at opposite sides of the vehicle and fixedly secured together by cross bars, members forming continuations of said rail sections equipped with arcuate portions, said members being readily removable from said rail sections, plate members equipped with arcuate portions forming guards mounted on and fixedly secured on some of said cross bars, the rail sections and removable members being of substantial U-shape in cross section with the side walls of the U return bent upon themselves, and means at the ends of the removable members for securing removable members to the rails.

5. A motor vehicle chassis frame comprising a front rail section, a rear rail section, the sides of said sections being fixedly secured together by cross bars, members forming continuations of said rail sections and readily removable therefrom, one wall of some of said cross bars being uniplanar with the ends of the front and rear rail sections, the rail sections and members being of substantially U-shape in cross-section with the side walls of the U return bent upon themselves, and means at the ends of the removable members for securing said members to the rails.

6. A motor vehicle chassis frame comprising a front rail section and a rear rail section, the sides of said rail sections being fixedly secured together by cross bars, members equipped with arcuate portions forming continuations of said rail sections and readily removable therefrom, one wall of some of said cross bars being uniplanar with the ends of the front and rear rail sections, plate members equipped with arcuate portions forming guards mounted on and fixedly secured to some of said cross bars, cushion blocks through which the axle passes fixedly secured to said plate members, the rail sections and removable members being of substantial U-shape in cross-section with the side walls of the U return bent upon themselves and means at the ends of the removable members for securing said members to the rails.

7. A motor vehicle chassis frame comprising rail sections at opposite sides of the vehicle, members equipped with an arcuate portion forming continuations of said sections, said members being readily removable from said rail sections, the rail sections and removable members being of substantially U-shape in cross section with the side walls of the U return bent upon themselves, and means at the ends of the removable members for securing said members to the rails.

8. A motor vehicle chassis frame comprising a front rail section, a rear rail section, the sides of said rail sections being fixedly secured together by cross bars, members forming continuations of said sections equipped with arcuate portions, said members being readily removable from said rail sections, plate members equipped with arcuate portions mounted on and fixedly secured to some of said cross bars, the arcuate portions of the removable members engaging the arcuate portions of the plate members forming a splash housing for the wheels of the vehicle, the rail sections and removable members being of substantial U-shape in cross section with the side walls of the U return bent upon themselves and means at the ends of the removable members for securing said members to the rails.

9. A motor vehicle chassis frame comprising rail sections at opposite sides of the vehicle and fixedly secured together by cross bars, some of said cross bars at their ends having right-angular flanges with an aperture therein, members forming continuations of said sections equipped with arcuate portions and apertures in the body portion of said members adjacent an end, said members being readily removable from said rail sections, plate members equipped with arcuate portions mounted on and fixedly secured to some of said cross bars, the arcuate portions of the removable members engaging the arcuate portions of the plate members, forming a splash housing for the wheels of the vehicle, the rail sections and removable members being of substantial U-shape in cross section with the side walls of the U return bent upon themselves and means at the ends of the removable members for securing said members to the rails, and a bolt engaging the apertures in the removable members and flanges of the cross bars for securing the removable members from accidental displacement from the rails.

ALVIN L. MARVEL.
DAVID E. SEMON.